US005974865A

United States Patent [19]

Dambach

[11] Patent Number: 5,974,865

[45] Date of Patent: Nov. 2, 1999

[54] DEVICE FOR DETECTING A FUEL SUPPLY SYSTEM LEAK DURING AN ENGINE OVERRUNNING PHASE

[75] Inventor: Dieter-Andreas Dambach, Korntal-Münchingen, Germany

[73] Assignee: Robert Bosch GmbH, Stuttgart, Germany

[21] Appl. No.: 08/930,203

[22] PCT Filed: Feb. 22, 1996

[86] PCT No.: PCT/DE96/00273

§ 371 Date: Oct. 6, 1997

§ 102(e) Date: Oct. 6, 1997

[87] PCT Pub. No.: WO96/31693

PCT Pub. Date: Oct. 10, 1996

[30] Foreign Application Priority Data

Apr. 7, 1995 [DE] Germany ........................... 195 13 158

[51] Int. Cl.[6] ...................................................... G01M 15/00

[52] U.S. Cl. ............................................ 73/49.7; 73/119 A

[58] Field of Search ........................... 73/40, 49.7, 118.1, 73/119 A

[56] References Cited

U.S. PATENT DOCUMENTS 4,977,872 12/1990 Hartopp ................................ 73/119 A
5,020,362 6/1991 Hart et al. ............................. 73/119 R
5,179,922 1/1993 Bartholomew ........................ 73/40.5 R
5,220,896 6/1993 Blumenstock et al. .
5,404,750 4/1995 Denz .
5,467,641 11/1995 Williams et al. ......................... 73/49.7
5,715,786 2/1998 Seiberth ................................ 73/119 A
5,723,780 3/1998 Miwa et al. .......................... 73/119 A

FOREIGN PATENT DOCUMENTS 4350358 4/1992 Japan .

*Primary Examiner*—Eric S. McCall
*Attorney, Agent, or Firm*—Michael J. Striker

[57] ABSTRACT

The device for detecting leaks in a fuel supply system for an internal combustion engine includes an electronic engine control unit (23) which tests for an engine overrunning mode, closes the injection valves and shuts off the fuel pump (11) if the overrunning mode is detected. Then this control unit (23) determines a pressure gradient (gradp) of a fuel supply line pressure measured by a pressure sensor (24) or a differential pressure gradient (grad δp) of a differential pressure between fuel supply and return lines (13,17) measured by a differential pressure sensor (25) after the injection valves (15) are closed. Then it compares the pressure gradient (gradp) or differential pressure gradient (grad δp) with a predetermined threshold (SW) or respective upper and lower thresholds ($SW_o$, $SW_u$) to determine if a leak has occurred.

7 Claims, 1 Drawing Sheet

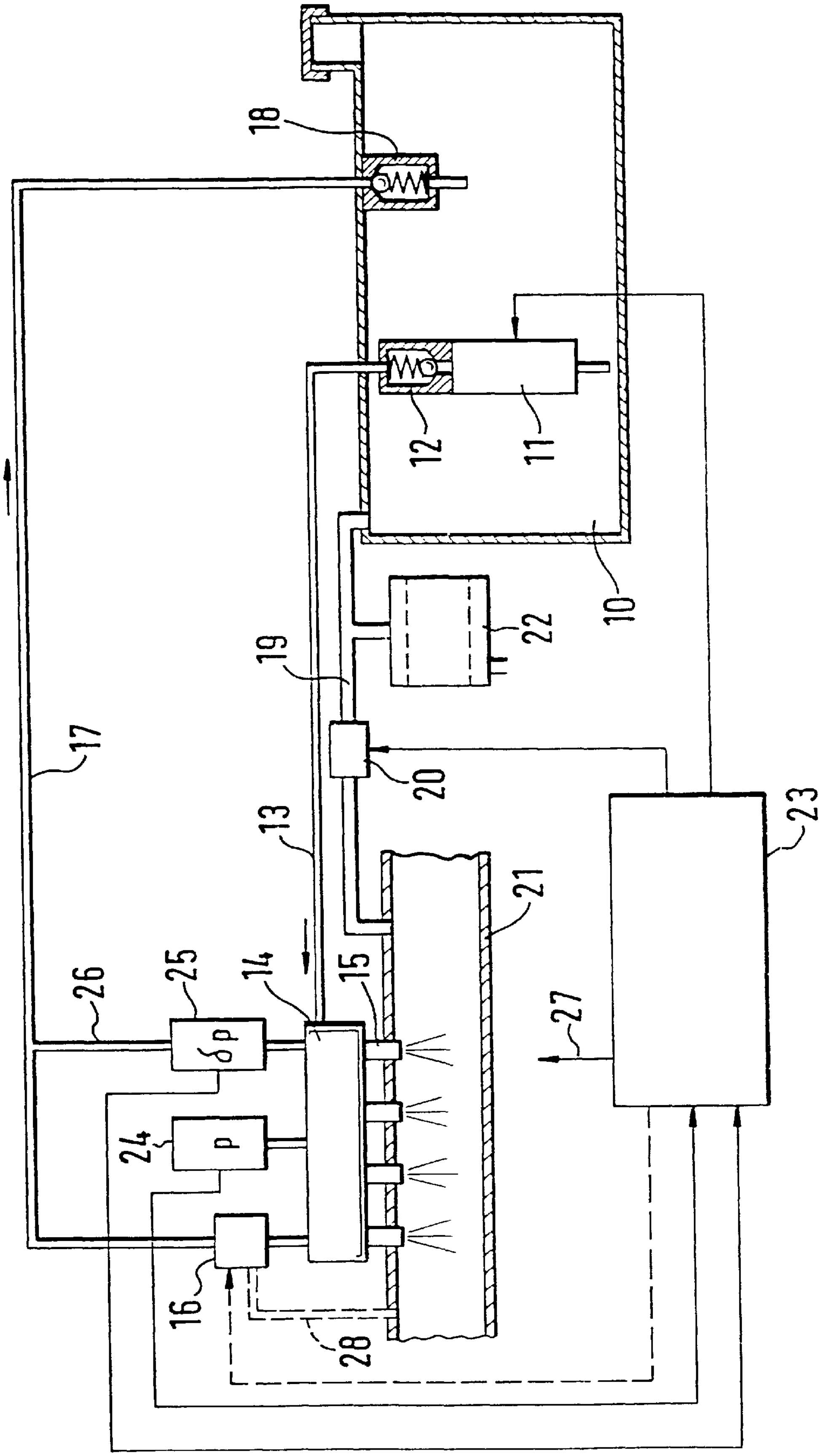
10
11
12
13
14
15
16
17
18
19
20
21
22
23
24
25
26
27
28
p
δp

DEVICE FOR DETECTING A FUEL SUPPLY SYSTEM LEAK DURING AN ENGINE OVERRUNNING PHASE

BACKGROUND OF THE INVENTION

Field of the Invention

The invention is based on a device for detecting a leak in a fuel supply system in an internal combustion engine, and, more particularly, to a device for detecting a leak in a fuel supply system in an internal combustion engine during an engine overrunning and for detecting which of several injection values is leaking.

In motor vehicles with an internal combustion engine, the fuel is pumped out of the fuel tank with the aid of an electric fuel pump and fed to the injection valves via fuel lines. Excess fuel typically returns to the tank via a return line. In order that an adequate quantity of fuel will always be available, the fuel is pumped by the electric fuel pump at an overpressure, and the electric fuel pump is regulated in a suitable way, for instance by measuring the fuel pressure and using it for evaluation.

In some fuel supply systems, the return line is dispensed with, and the fuel supply quantity regulation is demand-based. In both fuel supply systems it is mandatory that a leak or defect in the fuel circulation be detected with certainty and reliably, because otherwise, on the one hand, escaping fuel or incident fuel vapors could lead to emissions that exceed legal limits; on the other, defective injection valves might cause engine damage, if fuel were unintentionally able to reach an engine cylinder through the leaking injection valves.

In response to this problem, methods and apparatus have already been disclosed with whose aid leaking injection valves can be detected, or with whose aid leak detection is carried out in conjunction with a tank venting system. Such methods and apparatus are described for instance in German published, unexamined patent applications DE-OS 42 43 178 or DE-OS 40 40 896. In DE-OS 42 43 178, a method is disclosed in which leaking injection valves are detected by also firing cylinders into which fuel has not yet been injected, each time the engine is started. If such ignitions cause the rpm to increase perceptibly, then the association valve must be leaking, allowing fuel to enter the affected cylinder.

In the method and apparatus for checking the intactness of a tank venting system as disclosed in DE-OS 40 40 896, a test is done to find whether the negative pressure building up in the tank varies in a predictable way after the tank venting valve is opened. To that end, the entire system is monitored for functionality, and the system is assessed as nonfunctional if the negative-pressure buildup gradient is below a predeterminable threshold value.

Both known systems for detecting leaks in a portion of the fuel supply system of an internal combustion system are either rather complicated, or fail to guarantee that leak detection is possible throughout the entire fuel supply system.

SUMMARY OF THE INVENTION

It is an object of the present invention to provide a device for detecting a leak in a fuel supply system of an internal combustion engine of the above-described kind, which does not suffer from the above-described disadvantages.

It is also an object of the present invention to provide a device and method for detecting a leak in a fuel supply system of an internal combustion engine of the above-described kind during an engine overrunning phase of engine operation.

According to the invention the device for detecting a leak in a fuel supply system for an internal combustion engine during special operating conditions including an engine overrunning mode of the internal combustion engine comprises a pressure sensor for continuously generating a pressure sensor signal indicative of a fuel supply line pressure in a fuel supply line of a differential pressure sensor for continuously generating a differential pressure sensor signal indicative of a differential pressure between the fuel supply line and a fuel return line when the latter in present; and an engine control unit connected with the pressure sensor to receive the pressure sensor signal or with the differential pressure sensor to receive the differential pressure signal in the case in which a fuel return line is present. The engine control unit includes means for detecting an engine overrunning condition, means for closing injection valves of the engine when the engine overrunning condition of detected, means for shutting off the fuel pump when the injection valves are closed, means for determining a pressure sensor signal of a differential pressure gradient of the differential pressure form the differential pressure sensor signal after the injection valves are shut off and means for comparing the pressure gradient to a predetermined pressure gradient threshold or for comparing the differential pressure gradient to respective lower and upper predetermined differential pressure gradient thresholds and means for signaling a presence of the leak when the pressure gradient is greater than the predetermined gradient threshold stored in the engine control unit or when the differential pressure gradient is less than the lower differential pressure gradient threshold or greater than the upper different pressure gradient threshold.

The device according to the invention has the advantage over the prior art that the entire fuel supply system can be monitored for intactness. The simplicity of the device according to the invention is especially advantageous; in most conventional fuel supply systems, it can be employed without using additional expensive components.

This advantage is attained in that the fuel pressure is measured using a pressure sensor, and that after the electric fuel pump is switched off a test is done to find whether the overpressure in the fuel supply system varies in a predeterminable way. If not, it can be ascertained immediately that there is a leak or defect in the fuel supply system.

Additional advantages of the invention are attained by the provisions recited in the dependent claims. It is especially advantageous that the leak detection can be carried out in the form of an "on-board diagnosis" and is executed in the control unit of the motor vehicle. It is also advantageous that the leak detection can be employed both in fuel supply systems with a return line and in those without a return line.

In conjunction with other evaluations and error detections that are performed in the control unit, it is possible to detect precisely which injection valve is leaking. This can be done for instance by combining the leak detection with a method of detecting combustion misfiring.

The leak detection is done under special engine operating conditions, such as when the control unit detects an engine overrunning phase, in which during the overrunning shutoff the engine is no longer supplied with fuel through the injection valves. During the overrunning shutoff, the electric fuel pump is then shut off, after which the leak diagnosis is then performed.

Leak diagnosis during overrunning has the advantages that it can be performed more often and can be repeated during the same trip, and that continued operation of the control unit after engine shutoff is not required in order to perform the diagnosis.

BRIEF DESCRIPTION OF THE DRAWING

An exemplary embodiment of the invention is shown in the drawing and will be explained in further detail in the ensuing description. The sole FIGURE of the drawing schematically shows the essential components of a fuel supply system in which the leak detection according to the invention can be performed.

DESCRIPTION OF THE EXEMPLARY EMBODIMENTS

The components of a fuel supply system of an internal combustion engine that are essential in order to understand the invention are shown in the drawing. The fuel tank is shown at 10; the fuel pump 11, typically an electric fuel pump, and a check valve 12, which by way of example is integrated with the fuel pump 11, are located in the fuel tank.

From the fuel pump 11, the feed line 13 leads to the fuel distributor 14, by way of which the fuel is delivered to the injection valves 15. The fuel pressure is regulated with the aid of the pressure regulator 16, which in a fuel supply system having a fuel return line 17 communicates with the fuel tank 10 via the return line 17 and optionally via a pressure holding valve 18, and which optionally communicates with the intake tube of the engine via a connection 28.

For venting, the fuel tank 10 communicates with the engine intake tube 21 via a line 19 in which a venting valve 20 is located. An adsorption filter 22, in which the fuel vapors are trapped, is also present between the fuel tank 10 and the venting valve 20.

For controlling or regulating the engine, the control unit 23 is used, to which the requisite variables are supplied and which outputs the requisite trigger signals. The necessary calculations are performed in the control unit. The leak detection according to the invention is likewise performed in the control unit.

The variable needed for the control or regulation is measured using suitable sensors. The drawing shows, first, a pressure sensor 24, which measures the pressure p of the fuel in the distributor 14. As an alternative to the pressure sensor 24, a differential pressure sensor 25 may be provided, which communicates with the return line 17 via a line 26 and measures the differential pressure δp. As connections by way of which the triggering operations are effected, the drawing shows both the connection between the control unit 23 and the fuel pump 11 and the connection between the control unit and the venting valve 20, which valve is closed or opened depending on the prevailing conditions. A connection may also be present between the control unit 23 and the pressure regulator 16.

The fuel supply system leakage diagnosis can proceed, with the device shown in the drawing. The leakage diagnosis can be done under the following peripheral conditions:

1) As soon as the control unit detects an engine overrunning phase, in which during the "overrunning shutoff" of the injection valves 15 no further fuel is delivered to the engine. The fuel pump 11 is then turned off and the test is performed.
2) If the control unit has a so-called "continued operation mode"—that is, if it remains on for a certain "holding period" after then engine is turned off—then the diagnosis can be performed during this holding period, after which the fuel pump 11 is switched off.
3) If the control unit detects an engine overrunning phase, an overrunning shutoff can be effected, during which no further fuel is supplied to the injection valves. During the overrunning shutoff, the fuel pump can then be turned off.

The check valve 12 in the fuel loop, which by way of example is integrated with the fuel pump 11, still maintains the system pressure p for some time after the fuel pump is turned off. In the fuel supply system, the pressure sensor 24, which measures the fuel pressure p, is located on the pressure side of the check valve 12. Even after the fuel pump 11 is turned off, this pressure is measured and evaluated in the control unit. From the pressure course obtained, the control unit, or the microprocessor contained in the control unit, can ascertain the pressure gradient. This pressure gradient, which serves as a standard for the change in pressure, can be determined by one of the known gradient ascertaining methods; for example, the pressure gradient can be ascertained from two pressure values that are ascertained at a predeterminable time interval from one another.

If the pressure gradient ascertained is steeper than a threshold SW, which should be defined in some suitable way, then the control unit concludes that there is a defect or leak, and some indication or display 27, for instance, can be made, or warning signals can be emitted.

As the pressure sensor 24, a sensor with an analog starting variable can be used, but it is also possible to use a contact switch, in which the pressure gradient gradp over the time between when the fuel pump is switched off and the switching instant of the switch, if the system pressure fails to attain a predeterminable threshold, is determined.

The pressure sensor 24 is preferably located at the point indicated in the drawing, but it may be located elsewhere instead. If fuel supply systems without a return line, the entire fuel system may be monitored, if the pressure sensor 24 is installed at the point shown in the drawing.

Fuel supply systems with a fuel return 17 may also be monitored in their entirety, i.e. in their return region as well, if in addition to the check valve 12 in the fuel pump 11, a pressure holding valve 18 is mounted at the opening where the return line enters the fuel tank. It is then possible to monitor not only the feed region but the return region as well, until it enters the fuel tank. As the pressure sensor, a differential pressure sensor 25 is used in this case; it measures the differential pressure δp between the fuel feed line and the return line, for instance at the fuel pressure regulator. If there are leaks in the feed line, then after the fuel pump is shut off the differential pressure gradient grad δp (where δp =[Pfeed−Preturn]), again ascertained in the control unit, is initially less than in intact systems, while if there are leaks in the return line, the differential pressure gradient grad δp after the fuel pump is shut off is initially greater than in intact systems. By evaluating the differential pressure gradient δp and comparing it with two upper and lower threshold values $SW_o$ and $SW_u$, the leak detection can be performed in the control unit, and a suitable indication or display can be provided.

In a system having an internal combustion engine in which combustion misfiring detection is performed in the control unit anyway, it is possible by the combination of detecting combustion misfiring at a particular injection valve and a simultaneously detected leak in the fuel system to conclude which injection valve is leaking, and thereby to prevent possible engine damage, or to locate the defective valve correctly right away.

The leak detection can be performed by the control unit every time after the fuel pump is shut off, or it is also possible for this detection to be done only under specifiable conditions, such as only after the fuel pump has been off for a relatively long time. Since the method for leak detection is performed in the engine control unit, this kind of detection is "on-board diagnosis". The detection of an existing leak in the fuel supply system, or directly in an injection valve, can be stored in a memory of the control unit 23 and is then available as information the next time the vehicle is taken in for repair.

If the leak detection is done after the fuel pump is turned off and thus also after the engine is turned off, then continued operation of the control unit for a sufficiently long time is necessary; that is, the control unit must continue to be supplied with voltage after the engine is turned off, so that the requisite functions can still proceed. If the diagnosis is to be done during overrunning, then the fuel pump must be capable of being triggered by the control unit directly, that is, independently of the ignition key.

I claim:

1. A device for detecting a leak in a fuel supply system for an internal combustion engine during special operating conditions including an overrunning mode of the internal combustion engine, said internal combustion engine including injection valves (15) through which fuel is supplied thereto and said fuel supply system with a fuel tank (10), a fuel pump (11) and a fuel supply line (13) with or without a fuel return line (17) delivers the fuel via said fuel supply line at a fuel pressure to said injector valves (15), said device for detecting said leak comprising a pressure sensor (24) for continuously generating a pressure sensor signal indicative of said fuel pressure in said fuel supply line (13) or a differential pressure sensor (25) for continuously generating a differential pressure sensor signal indicative of a differential pressure between said fuel supply line (13) and said fuel return line (17) when said fuel supply system has said fuel return line; and an engine control unit (23) connected with said pressure sensor (24) to receive said pressure sensor signal or connected with said different pressure sensor (25) to receive said differential pressure signal when said fuel supply system has said fuel return line, wherein said engine control unit (23) includes means for detecting an engine overrunning condition, means for closing said injection valves (15) when said engine overrunning condition is detected;

means for shutting off said fuel pump (11) when said injection valves (15) are closed;

means for determining a pressure gradient (gradp) of said fuel pressure from said pressure sensor signal or a differential pressure gradient (grad δp) of said differential pressure from said differential pressure sensor signal after said injection valves (15) are shut off; and means for comparing said pressure gradient (gradp) to a predetermined pressure gradient threshold (SW) or said differential pressure gradient (grad δp) to respective lower and upper predetermined differential pressure gradient thresholds ($SW_o$, $SW_u$); and means for signaling a presence of a leak when said pressure gradient (gradp) is greater than said predetermined gradient threshold (SW) or when said differential pressure gradient (grad δp) is less than said lower differential pressure gradient threshold ($SW_u$) or greater than said upper differential pressure gradient threshold ($SW_o$).

2. The device as defined in claim 1, wherein said engine control unit (23) includes said means for determining said pressure gradient (gradp) and said means for comparing said pressure gradient (gradp) to said predetermined pressure gradient threshold (SW).

3. The device as defined in claim 1, wherein said engine control unit (23) includes said means for determining said differential pressure gradient (grad δp) and said means for comparing said differential pressure gradient (grad δp) to said respective lower and upper predetermined differential pressure gradient thresholds ($SW_o$, $SW_u$).

4. The device as defined in claim 3, further comprising a pressure holding valve (18) arranged at an entrance of fuel return line (17) to said fuel tank (10) to enable diagnosis of said fuel return line.

5. The device as defined in claim 1, wherein said internal combustion engine includes a plurality of cylinders each having at least one of said injection valves and said engine control unit (23) includes means for detecting a misfiring in each of said cylinders and means for combining misfiring detection and leak detection in order to unequivocally determine if one of said injection valves is leaking and which of said injector valves is leaking.

6. A method of detecting a leak in a fuel supply line or fuel return line in a fuel supply system of an internal combustion engine during an engine overrunning mode, said internal combustion engine having a plurality of cylinders each equipped with at least one injection valve and said fuel supply system including a fuel tank, a fuel pump and the fuel supply line with or without the fuel return line, said method including the steps of:

a) measuring a pressure in the fuel supply line (13) by means of a pressure sensor (24) or a differential pressure between said fuel supply line (13) and said fuel return line (17) by means of a differential pressure sensor (25) when said fuel supply system has said fuel return line;

b) detecting an engine overrunning condition in an electronic engine control unit (23) of the internal combustion engine;

c) closing said injection valves (15) when said engine overrunning condition is detected;

d) shutting off said fuel pump (11) when said injection valves (15) are closed;

e) determining a pressure gradient (gradp) of said fuel supply line pressure from said pressure measured by said pressure sensor (24) or a differential pressure gradient (grad δp) of said differential pressure measured by said differential pressure sensor when said fuel supply system has said fuel return line, after said injection valves (15) are shut off;

f) comparing said pressure gradient (gradp) to a predetermined pressure gradient threshold (SW) or comparing said differential pressure gradient (grad δp) to respective lower and upper predetermined differential pressure gradient thresholds ($SW_o$, $SW_u$); and g) signaling a presence of a leak when said pressure gradient (gradp) is greater than said predetermined gradient threshold (SW) stored in said engine control unit or when said differential pressure gradient (grad δp) is less than said lower differential pressure gradient threshold ($SW_u$) or greater than said upper differential pressure gradient threshold ($SW_o$).

7. The method as defined in claim 6, further comprising testing for a misfiring in each of said cylinders and after detecting a misfiring combining misfiring detection and leak detection in order to unequivocally determine if one of said injection valves is leaking and which of said injector vales is leaking.

* * * * *